Nov. 11, 1924.

H. BARKMANN ET AL 1,515,327

TRUCK

Filed Dec. 22, 1923   5 Sheets-Sheet 1

Inventors:
Henry Barkmann and
Alois Kutscha
By: Wm O. Bell, Atty.

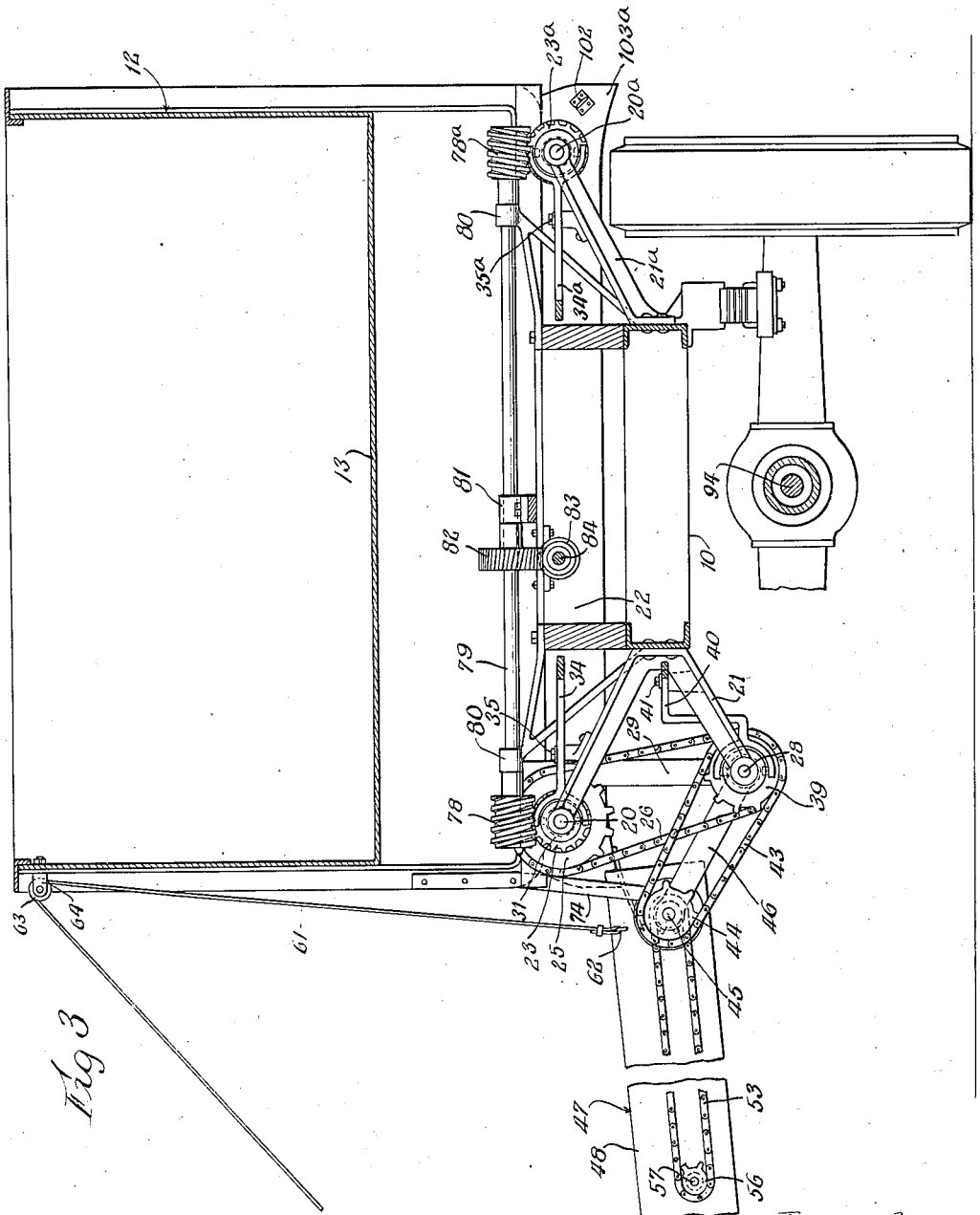

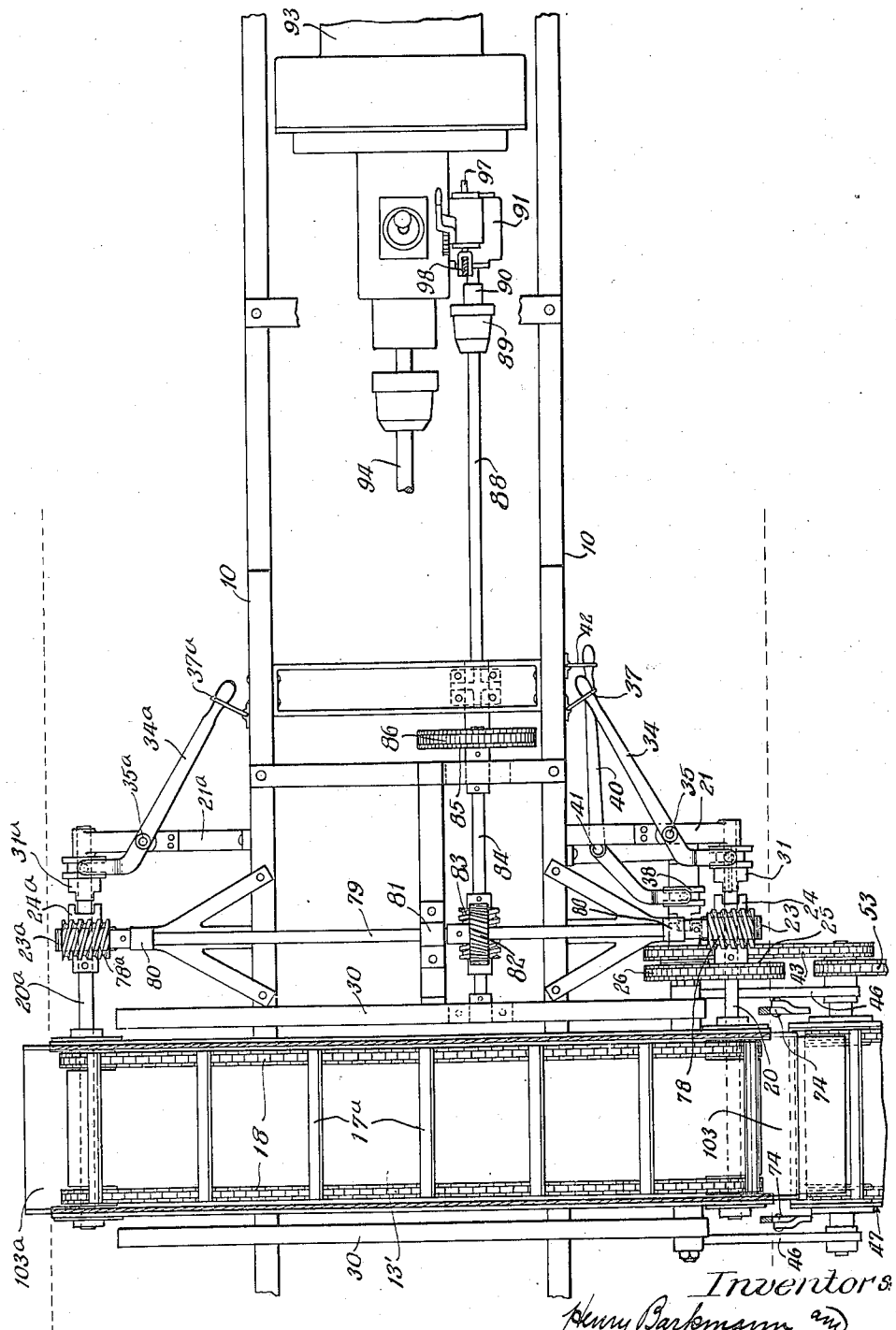

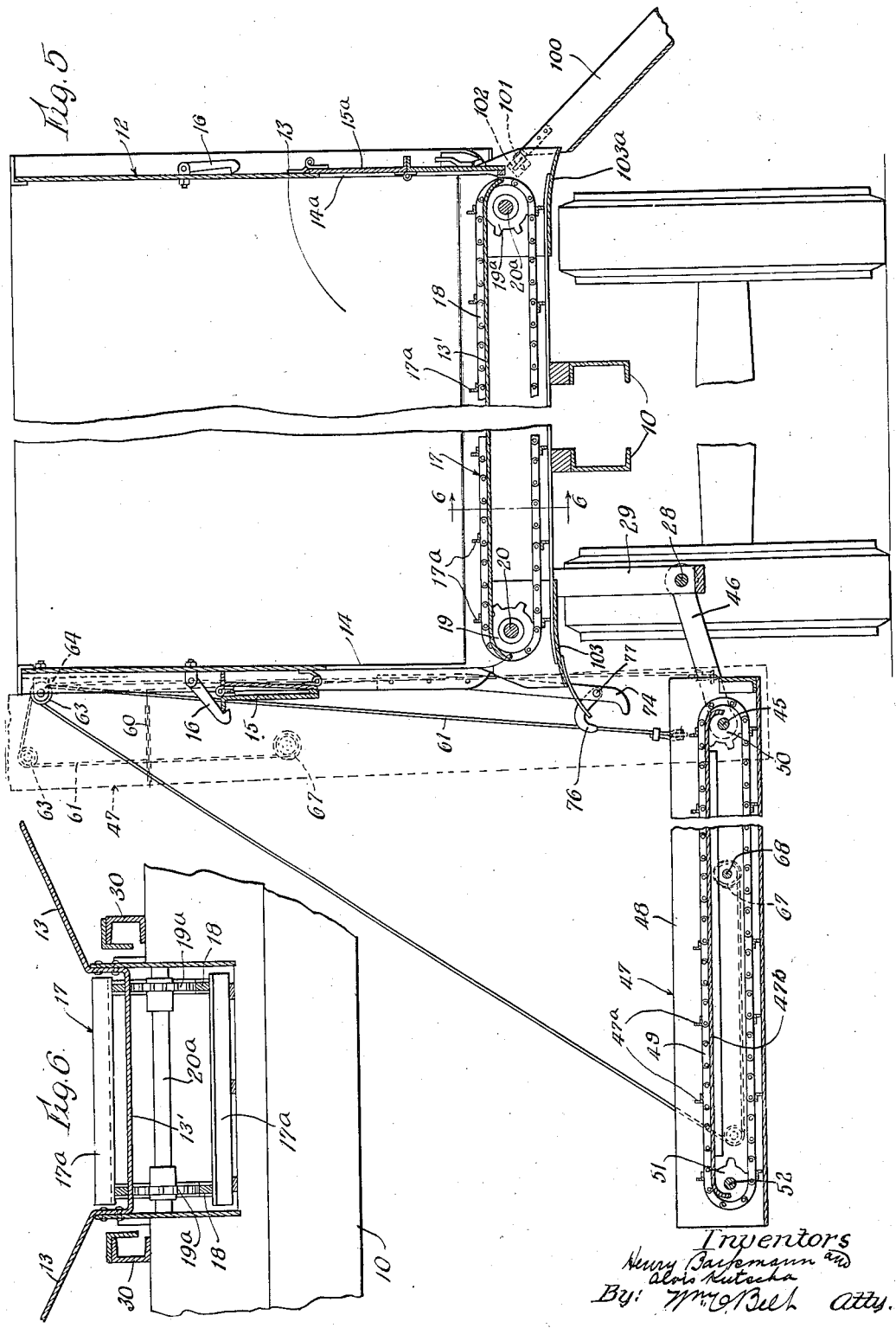

Nov. 11, 1924.  1,515,327
H. BARKMANN ET AL
TRUCK
Filed Dec. 22, 1923  5 Sheets-Sheet 5
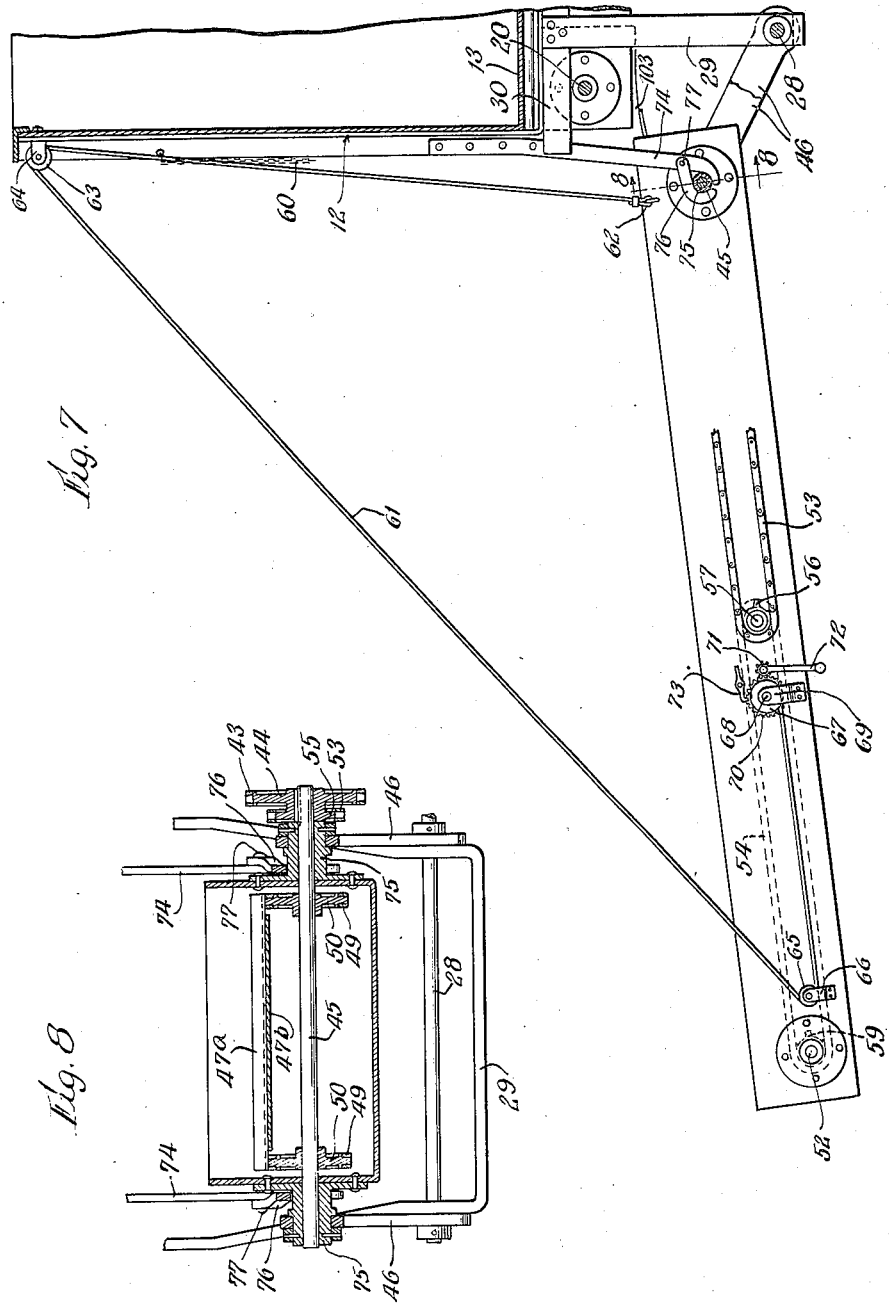

Patented Nov. 11, 1924.

1,515,327

UNITED STATES PATENT OFFICE.

HENRY BARKMANN AND ALOIS KUTSCHA, OF CHICAGO, ILLINOIS.

TRUCK.

Application filed December 22, 1923. Serial No. 682,160.

*To all whom it may concern:*

Be it known that we, HENRY BARKMANN and ALOIS KUTSCHA, citizens of the United States, residing at Chicago, in the county of Cook and State of Illinois, have invented certain new and useful Improvements in Trucks, of which the following is a specification.

The object of this invention is broadly to provide a truck which has an improved body adapted to receive a load of bulk material and which has improved means adapted to deliver the bulk material from the body without accompanying tilting or raising of the body.

Other objects of the invention are to provide a truck of the character described which has an improved body having a plurality of discharge outlets; which has improved means for mechanically discharging a load of bulk material through any one of the plurality of discharge outlets in its body; which has a conveyor adapted to discharge a load of bulk material through any selected discharge outlet in its body; which has means common to the plurality of discharge outlets for discharging a load of bulk material through any selected one of the discharge outlets in its body; which has an improved delivery conveyor for receiving the material discharged from its body; which has secured to it an improved delivery conveyor movable into and out of operative position with respect to a discharge outlet in its body so that the delivery conveyor can be brought quickly and easily into the operative position, and which has improved means for operating conveyors adapted to discharge a load of material from its body.

Other objects of our invention will become apparent as the detail description progresses, reference being had to the accompanying drawings, wherein Fig. 1 is a side elevation of a motor truck having a body for bulk material and embodying our invention.

Fig. 3 is a transverse sectional view on line 3—3 of Fig. 1, the delivery conveyor being shown in an inoperative position with respect to a discharge outlet in the body of the truck.

Fig. 4 is a top plan view of a portion of the truck, certain parts being broken away, showing the drag conveyor and the mechanism for operating the conveyors.

Fig. 5 is a transverse sectional view on line 5—5 of Fig. 1.

Fig. 6 is a section taken on line 6—6 of Fig. 5.

Fig. 7 is a section taken on line 7—7 of Fig. 1, the delivery conveyor being shown in operative position with respect to a discharge outlet in the body of the truck, and Fig. 8 is a section taken on line 8—8 of Fig. 7.

Figures 1, 2:
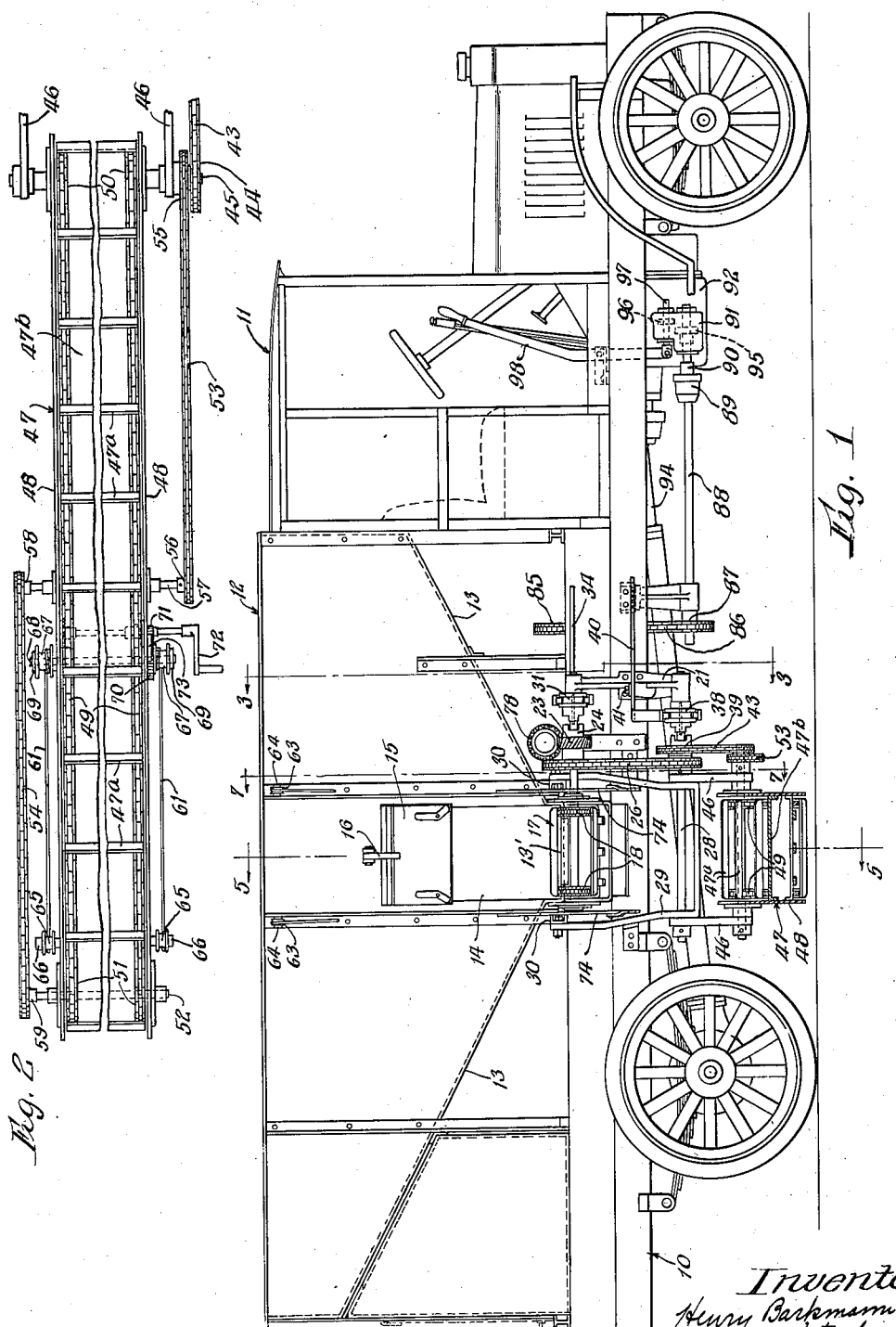
Fig. 2 is a plan view of a delivery conveyor forming a part of our improved truck.

This invention relates to a truck which comprises certain improvements upon the invention disclosed in our pending application, Serial No. 610,271, filed under date of January 2, 1923.

Referring to the drawings, 10 indicates the chassis of a motor truck having a cab 11 and a body 12 supported thereon, the body being adapted to contain bulk material, such as, coal and the like, and having a bottom 13 which inclines from the front and from the rear to a transverse section 13' located in alignment with a plurality of discharge openings 14 and $14^a$ (Figs. 1 and 5). The outlets 14 and $14^a$ are normally closed by hinged doors 15 and $15^a$ respectively which may be secured in open positions by suitable latch devices 16. A drag conveyor 17 is arranged to have its upper leg travel over and adjacent the section 13' of the bottom to carry the material in the body of the truck to either of the discharge outlets 14 and $14^a$ and to deliver it from the body. The drag conveyor 17 preferably comprises a plurality of link chains 18 which travel over sprockets 19 and $19^a$ on the shafts 20 and $20^a$ respectively.

The shaft 20 is journaled in a bracket 21 carried by the chassis 10 and is also journaled in a body frame 22 supported by the chassis. In a like manner, the shaft $20^a$ is journaled in a bracket $21^a$ carried by the chassis 10, and in the body frame 22. Each of the shafts 20 and $20^a$ has a worm gear rotatably journaled upon it, the worm gear associated with the shaft 20 being designated by the reference character 23, while the worm gear associated with the shaft $20^a$ is designated by the reference character $23^a$. A sleeve 24 formed integral with the worm gear 23 carries a sprocket 25 which is adapted, by means of a sprocket chain 26, to drive a sprocket 27 rigidly secured to a shaft 28.

The shaft 28 is rotatably journaled in the bracket 21 and in a U-shaped bracket 29 depending from a pair of channels 30 arranged transversely of the truck and resting upon the body frame 22. The worm gear 23ª has a sleeve 24ª formed integrally with it, the sleeve 24ª forming one member of a clutch which also comprises a grooved sleeve 31ª splined upon the shaft 20ª. As best shown in Fig. 4, the sleeves 24ª and 31ª are provided with jaws adapted to inter-engage so that the worm gear 23ª may be employed to drive the shaft 20ª. On the other side of the machine, the sleeve 24 also forms part of a clutch comprising a grooved sleeve 31 splined upon the shaft 20, the grooved sleeve 31 being provided with the jaws adapted to engage jaws upon the sleeve 24. The grooved sleeves 31 and 31ª may be shifted longitudinally of their respective shafts 20 and 20ª by means of clutch levers 34 and 34ª respectively. The clutch lever 34 is pivotally secured to the bracket 21 by a pin 35, a pin 35ª being employed to pivotally secure the clutch lever 34ª to the bracket 21ª. Rings 37 and 37ª carried by the chassis provide means whereby the levers may be secured in positions wherein they hold the grooved sleeves 31 and 31ª disengaged from the sleeves 24 and 24ª.

Referring now to Figs. 1 and 3, it will be noted that the shaft 28 is provided with a grooved collar 38 which is splined to the shaft and which has jaws adapted to engage the jaws formed upon the hub of a sprocket 39 rotatably journaled upon the shaft. It is apparent that when the grooved collar 38 is brought into engagement with the hub of the sprocket 39, the sprocket 39 will rotate with the shaft if the shaft is driven by means of the aforementioned sprockets 25 and 27 and the sprocket chain 26. A clutch lever 40 pivotally mounted upon the bracket 21 by means of a pin 41 is provided to bring the grooved collar 38 into and out of a position wherein its jaws engage the jaws formed upon the hub of the sprocket 39. The clutch lever 40 may be secured in a position wherein it holds the grooved collar 30 out of engagement with the sprocket 39. This means comprises a ring 42 swiveled upon the chassis 10. Meshing with the sprocket 39 is a sprocket chain 43 which also meshes with a sprocket 44 rigidly secured to a shaft 45 journaled in the free end of a frame 46, the frame 46 being pivotally mounted upon the shaft 28. The shaft 45 is the driving shaft of a delivery conveyor 47 having a frame 48 pivotally mounted upon the shaft 45.

The delivery conveyor 47 preferably comprises a plurality of link chains 49 meshing with sprockets 50 carried on the shaft 45 and meshing with sprockets 51 rigidly secured to a shaft 52 which is rotatably journaled in the free end of the conveyor frame 48 (Figs. 2 and 5). The shaft 52 is operatively connected to the shaft 45 by means of a plurality of sprocket chains 53 and 54.

The sprocket chain 53 meshes with a sprocket 55 rigidly secured to the shaft 45 and also meshes with a sprocket 56 rigidly secured to a shaft 57 rotatably journaled in the conveyor frame 48 at a point substantially midway of its ends. The sprocket chain 54 meshes with a sprocket 58 rigidly secured to the shaft 57 and also meshes with a sprocket 59 rigidly secured to the shaft 52.

In Fig. 5, the delivery conveyor 47 is shown in an inoperative position with respect to the discharge outlet 14 in the body 12. The term "inoperative" is used in the sense that the conveyor is not then positioned correctly with respect to the discharge outlet if the best results are to be obtained while the conveyor is in operation, When the delivery conveyor is in the position shown in Fig. 5, it may be brought into the vertical position indicated in dotted lines which may be termed the carrying position. The delivery conveyor will then be disposed snugly against one side of the truck, a chain 60 being provided to secure it in this position. This construction is advantageous in that the conveyor will not interfere with nor impede the passage of the truck through streets or alleys, nor will the conveyor project an undesirable distance above the body. In Fig. 7, we have shown the delivery conveyor with its inner end raised so that the conveyor is in its operative position with respect to the discharge outlet 14. The means for bringing the delivery conveyor 47 from the position shown in Fig. 5 to the position shown in Fig. 7 comprises a cable 61 which has one of its ends secured to the pivoted end of the conveyor frame 48, as indicated at 62. The cable is trained over a sheave 63 journaled in a bracket 64 mounted upon the body 12 and is also trained over a sheave 65 rotatably journaled in a bracket 66 secured to the conveyor frame 48 at a point adjacent its free end. The remaining end of the cable 61 is wound upon a drum 67 which is mounted upon a shaft 68 rotatably journaled in the conveyor frame 48 and in a bracket 69 secured to the conveyor frame. Fixed with respect to the drum 67 is a gear 70 meshing with a pinion 71 which may be rotated by means of a crank 72. A pawl 73 pivotally secured to the conveyor frame 48 is adapted to engage the teeth of the gear 70 so as to hold the gear against angular displacement. When the delivery conveyor 47 is to be brought into the position shown in Fig. 7, the pivoted end of the conveyor is first lifted, manually, until the axis of the shaft 45 lies in or slightly above a plane passing through the axes of the shafts 52 and 28. The cable 61 is then wound upon the drum 67 by means of the crank 72 and the pivoted end of the conveyor continues to rise until it comes to rest upon brackets 74 which extend downwardly from the truck body 12, one of the brackets 74 being disposed on one side of the discharge outlet 14, and the other of the brackets being disposed on the other side of the discharge outlet 14. It will be noted that the lower ends of the brackets 74 are curved to engage the cylindrical surfaces of the journal boxes 75 which form a part of the delivery conveyor frame 48 and which rotatably journal the aforementioned shaft 45. The pivoted end of the conveyor is secured in this position with respect to the brackets 74 by means of latch members 76, the latch members being pivotally secured to the brackets 74 by pins 77. In the preferred form of our device, the latch members 76 are designed to snap over the journal boxes 75 (Fig. 7). When the pivoted end of the conveyor has been secured in the position shown in Fig. 7, continued rotation of the drum 67 will wind up the cable 61 and cause the free end of the conveyor to swing upwardly. It is readily understood that the free end may be lowered by simply rotating the drum 67 in the reverse direction. The cable 61 and drum 67 also provide means for raising the conveyor from the full line to the dotted line position shown in Fig. 5, as will be evident.

We will now describe the means for operatively connecting the conveyor mechanism with the power unit of the truck.

Referring to Figs. 3 and 4, it will be seen that the worm gear 23 is in mesh with a worm 78 and that the worm gear 23ª is in mesh with a worm 78ª, the worms 78 and 78ª being rigidly secured to a shaft 79 arranged transversely of the truck. The shaft 79 is suitably journaled in bearing brackets 80 and in a bearing block 81, the bearing block 81 being disposed intermediate the bearing brackets 80. A worm gear 82 rigidly secured to the shaft 79 meshes with a worm 83 fastened to a jack shaft 84 extending longitudinally of the truck. The forward end of the jack shaft 84 is provided with a sprocket 85 meshing with a sprocket chain 86, which in turn meshes with a sprocket 87 secured to a shaft 88 also extending longitudinally of the truck. The forward end of the shaft 88 terminates in a universal joint 89 from which projects a corresponding shaft section 90 journaled in a gear housing 91 mounted upon a transmission case 92 which contains the change speed gearing of the truck. The internal combustion engine of the truck is indicated at 93 and the propeller shaft at 94 (Fig. 1). The shaft section 90 has rigidly secured to it a gear 95 with which a pinion 96 may be made to mesh, the pinion 96 being rotatably journaled upon a rod 97 slidably journaled in the gear housing 91. The pinion 96 may be driven by suitable gears disposed intermediate the pinion 96 and the gears of the truck transmission. The pinion 96 is preferably held against displacement longitudinally of the rod 97 and may be brought into mesh with the gear 95 by means of a lever 98 which may be employed to shift the rod.

Turning now to Fig. 5, it will be noted that the delivery conveyor 47 is only adapted to receive material discharged through the discharge outlet 14, and that other means are provided for receiving the material discharged through the discharge outlet 14ª. This means is preferably a chute 100 detachably secured in its operative position by means of hooks 101 adapted to engage eyes 102 secured to a spout device 103ª disposed directly beneath the discharge outlet 14ª. The discharge outlet 14 is provided with a similar spout 103.

Each of the conveyors 17 and 47 preferably comprises a plurality of chains having a plurality of flights riveted to links of the chains. In the conveyor 17, the flights 17ª of the upper leg of the conveyor pass over the transverse section 13′ located in alignment with the discharge openings or outlets 14 and 14ª so that the transverse section 13′ not only forms a part of the bottom of the truck but also forms a part of the conveyor. In the delivery conveyor 47, the link chains 49 have riveted to them a plurality of flights 47ª which travel over a table 47ᵇ. The table 47ᵇ forms part of the delivery conveyor frame 48.

A truck embodying the novel features of our invention may deliver a load of material to a manhole, to a vault, or to any other desired place. The plurality of discharge outlets in the body of the truck and the provision of a delivery conveyor associated with one of the discharge outlets enables the driver of the truck to select a mode of discharge particularly adapted to the task at hand. Thus if the load is to be delivered to a manhole it is only necessary to bring the discharge outlet 14ª into a proper position with respect to the manhole and to attach the chute 100 to the spout 103ª, the lower end of the chute being positioned in the manhole. Then, as soon as the hinged door 15ª is opened, the material within the body will run out through the discharge outlet 14ª until the remaining material in the body assumes an angle of rest. The drag conveyor 17 is then placed in operation by bringing the pinion 96 into mesh with the gear 95 through the medium of the lever 98 and by bringing the jaws of the grooved sleeve 31ª into engagement with the jaws of the sleeve 24ª through the medium of the lever 34ª. When the levers 98 and 34ª have been properly manipulated, the conveyor 17 will discharge the material through the discharge outlet 14ª, the means operatively connecting the conveyor with the gear 95 being the shaft section 90, shaft 88, sprocket 87, sprocket chain 86, sprocket 85, jack shaft 84, worm 83, worm gear 82, shaft 79, worm 78ª, worm gear 23ª, and the grooved sleeve 31ª which is splined upon the shaft 20ª. After the load has been discharged from the body, the levers 34ª and 98 are returned to their normal positions.

When the load is to be discharged into a vault or other enclosure through a window or the like, or when it is impossible or impractical to use the chute 100, the truck is brought into a position which enables the driver to bring the delivery conveyor 47 into a proper position for delivering the load through the window in the vault, or for delivering the load to a particular place or spot. To lower the conveyor 47, it is only necessary to rotate the drum 67 to unwind the cable 61, which action will permit the conveyor to fall into the position shown in full lines in Fig. 5. The pivoted end of the conveyor is then brought into its operative position with respect to the discharge outlet 14 by means and in the manner hereinbefore described. The hinged door 15 is then brought into and secured in its open position. The material of the load will then flow out upon the delivery conveyor which may be set in operation by means of the levers 98 and 40, the lever 98 being employed to mesh the pinion 96 with the gear 95, and the lever 40 being employed to bring the grooved collar 38 into engagement with the hub of the sprocket 39. The delivery conveyor is then driven through a train of mechanism comprising the gear 95, the shaft section 90, the universal joint 89, the shaft 88, the sprocket 87, the sprocket chain 86, the sprocket 85, the jack shaft 84, the worm 83, the worm gear 82, the shaft 79, the worm 78, the worm gear 23, the sprocket 25, the sprocket chain 26, the sprocket 27, the shaft 28, the grooved collar 38, the sprocket 39, the sprocket chain 43, the sprocket 44, and the shaft 45, which is the driving shaft of the delivery conveyor, the shaft 52 being the driven shaft of the delivery conveyor. As hereinbefore set forth, the driving shaft 45 is connected to the driven shaft 52 through the medium of sprocket chains 53 and 54, the sprocket chain 53 being disposed on one side of the delivery conveyor and the sprocket chain 54 being disposed on the other side of the delivery conveyor. As the material flows from the discharge outlet 14 and drops upon the pivoted end of the delivery conveyor, it is carried away by the conveyor. When the material remaining in the body of the truck has assumed an angle of rest, the drag conveyor 17 is set in operation to discharge the remaining material through the discharge outlet 14 to the delivery conveyor 47. The means for setting the drag conveyor in operation for discharging the material through the discharge outlet 14 comprises the lever 34 which may be positioned to hold the grooved sleeve 31 in engagement with the sleeve 24 formed integral with the worm gear 23. It is apparent that the drag conveyor will then convey the material in the truck to the discharge outlet 14.

An advantage of the construction employed in the delivery conveyor 47 is the absence of a force tending to twist or distort the delivery conveyor frame 48. This advantage is obtained by connecting the driving shaft 45 to the driven shaft 52 through a plurality of sprocket chains, one of which is substantially half the length of the conveyor and is disposed on one side of the conveyor, the other sprocket chain being substantially half the length of the conveyor and being disposed on the other side of the conveyor.

We are aware that changes in the form, construction and arrangement of parts may be made without departing from the spirit and without sacrificing the advantages of the invention, and we reserve the right to make all such changes as fairly fall within the scope of the following claims:—

We claim:—

1. A truck body comprising a bottom and longitudinal sides, each of said sides having a single discharge opening therein, said bottom having a portion in alinement with said openings, a drag conveyor traveling thereover and arranged transversely of the body to convey material therein to either of said openings and the entire remainder of said bottom extending downwardly to said first-named portion to direct all the material in said body to said conveyor.

2. A truck body comprising a bottom, front and rear ends, and longitudinal sides, each of said sides having a single discharge opening therein, the entire bottom being divided into three portions, one of which is in alinement with said openings and the other two of which are inclined downwardly from said front and rear ends to said first-named portion, and a drag conveyor travelling over said first named portion whereby all the material in said body is directed to said conveyor and carried by said conveyor to one of said openings.

3. In a truck, a body having a plurality of discharge outlets, a drag conveyor disposed in the body intermediate the outlets for conveying the material of the load within the body to either of the outlets, a pivotally mounted delivery conveyor for receiving material discharged through one of the outlets, means for securing the delivery conveyor in a plurality of adjusted positions with respect to said outlet, and means for operating the conveyors.

4. In a truck, a body having a plurality of discharge outlets, a drag conveyor disposed in the body intermediate the outlets for conveying the material of the load within the body to either of the outlets, a delivery conveyor for receiving the material discharged through one of said outlets, and means for operating the drag conveyor with or independently of said delivery conveyor.

5. In a truck, a body having a plurality of discharge outlets, a drag conveyor disposed in the body intermediate the outlets for conveying the material of the load within the body to either of the outlets, a power shaft, means for operatively connecting the drag conveyor with the power shaft to discharge the material of the load through one of the outlets, and a second means for operatively connecting the drag conveyor with the power shaft to discharge the material of the load through the other of the outlets.

6. In a truck, a body having a plurality of discharge outlets, a drag conveyor disposed in the body intermediate the outlets for conveying the material of the load within the body to either of the outlets, a power shaft, means for operatively connecting the drag conveyor with the power shaft to discharge the material of the load through one of the outlets, a second means for operatively connecting the drag conveyor with the power shaft to discharge the material of the load through the other of the outlets, a delivery conveyor and a third means including a clutch for operatively connecting the delivery conveyor with the power shaft.

7. In a truck, a body having a discharge outlet, a delivery conveyor movable into and out of an operative position with respect to the discharge outlet, means for bringing said conveyor into said operative position and comprising a drum carried by the conveyor, and a cable having one of its ends secured to the drum and the other of its ends secured to the conveyor frame, and means for holding the conveyor in said operative position.

8. In a truck, the combination of a chassis carrying an engine, a body having a discharge outlet, a pivotally mounted delivery conveyor for receiving material discharged through said outlet and comprising a driving shaft, a driven shaft, a shaft disposed intermediate the driving and driven shafts, means disposed on one side of the conveyor for operatively connecting said driving shaft with said intermediate shaft, and means disposed on the other side of the conveyor for connecting said intermediate shaft with said driven shaft, and means operatively connecting the driving shaft with the engine.

9. In combination, a truck, a conveyor having one end pivoted thereto, said pivot being movable vertically, said conveyor being in its operative position when said pivot is near the top of its vertical movement, and means for raising said pivot.

10. In combination, a truck, a conveyor having one end pivoted thereto, said pivot being movable vertically, said conveyor being in its operative position when said pivot is near the top of its vertical movement, means for raising said pivot, and means to hold said pivot in its upper position to retain said conveyor in its operative position.

11. In combination, a truck, a conveyor having one end pivoted thereto, said pivot being movable vertically, said conveyor being in its operative position when said pivot is near the top of its vertical movement, and means for raising said pivot, continued operation of said means raising the free end of the conveyor.

12. In combination, a truck, a frame pivoted thereto and movable vertically, a conveyor pivoted to said frame, and means to move said last-named pivot, the conveyor being in its operative position when said pivot is at its uppermost position and inoperative when it is at a lower position.

13. In combination, a truck, a frame pivoted thereto and movable vertically, a conveyor pivoted to said frame, means to move said last-named pivot, the conveyor being in its operative position when said pivot is at its uppermost position and inoperative when it is at a lower position, and means to hold said pivoted end of the conveyor in its operative position.

14. In combination, a truck, a frame pivoted thereto and movable vertically, a conveyor pivoted to said frame, and means to move said last-named pivot, the conveyor being in its operative position when said pivot is at its uppermost position and inoperative when it is at a lower position, continued operation of said means raising the free end of said conveyor.

HENRY BARKMANN.
ALOIS KUTSCHA.